US010497190B2

(12) United States Patent
Maggioni

(10) Patent No.: US 10,497,190 B2
(45) Date of Patent: Dec. 3, 2019

(54) ELECTRONIC ACCESS CONTROL METHOD

(71) Applicant: Bundesdruckerei GmbH, Berlin (DE)

(72) Inventor: Christoph Maggioni, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 15/575,772

(22) PCT Filed: May 17, 2016

(86) PCT No.: PCT/EP2016/060958
§ 371 (c)(1),
(2) Date: Nov. 20, 2017

(87) PCT Pub. No.: WO2016/188788
PCT Pub. Date: Dec. 1, 2016

(65) Prior Publication Data

US 2018/0122167 A1 May 3, 2018

(30) Foreign Application Priority Data

May 27, 2015 (DE) ........................ 10 2015 108 330

(51) Int. Cl.
*G07C 9/00* (2006.01)
*G06K 7/10* (2006.01)

(52) U.S. Cl.
CPC ..... *G07C 9/00079* (2013.01); *G07C 9/00007* (2013.01); *G07C 9/00031* (2013.01);
(Continued)

(58) Field of Classification Search
CPC ....... G06K 19/07354; G06K 19/07372; G06K 9/00288; G06K 9/6267; G06K 9/78;
(Continued)

(56) References Cited

U.S. PATENT DOCUMENTS

| | | | | |
|---|---|---|---|---|
| 4,006,459 A * | 2/1977 | Baker | G07C 9/00079 340/5.6 |
| 2008/0302870 A1* | 12/2008 | Berini | G07C 9/00087 235/380 |

(Continued)

FOREIGN PATENT DOCUMENTS

| | | |
|---|---|---|
| DE | 10 2010 016098 A1 | 9/2011 |
| DE | 10 2012 203 311 A1 | 9/2013 |

(Continued)

*Primary Examiner* — Dionne Pendleton
(74) *Attorney, Agent, or Firm* — Holland & Hart LLP

(57) ABSTRACT

Methods, systems, and devices are described for electronic access control. An electronic access control method for identifying a person within an access region is described. An identification document may be associated with the person. The method may include sensing an identification characteristic of the person in the access region based at least in part on the identification document using an identification sensing device; transmitting the identification characteristic using the identification sensing device to a biometric sensing device; and sensing a biometric characteristic of the person using the biometric sensing device within the access region in response to receipt of the identification characteristic to identify the person.

17 Claims, 3 Drawing Sheets

(52) U.S. Cl.
CPC ..... *G07C 9/00047* (2013.01); *G07C 9/00071* (2013.01); *G07C 9/00111* (2013.01); *G07C 9/00134* (2013.01); *G07C 9/00158* (2013.01)

(58) Field of Classification Search
CPC ........... G06K 19/0718; G06K 19/0723; G06K 9/00718; G06K 9/00013; G06K 9/00087; G06K 9/00154; G06K 9/00604; G06K 9/00617; G07C 2009/00095; G07C 9/00087; G07C 9/00079; G07C 9/00103; G07C 2209/02; G07F 17/3216; G07F 17/323; G07F 17/3244; G07F 17/3295; G07F 7/0813; G07F 7/1016; G07F 19/20; G06F 17/30247; G06F 17/30424; G06F 17/3053; G06F 3/005; G06F 3/0482; G06F 3/0488; G06F 3/1423; G06F 3/1431; G06F 3/147; G06F 3/167; G06F 21/32; G06F 16/245; G06F 16/24578; G06F 16/583; G06F 21/34; G06F 21/45; G06F 21/602; G06F 21/6245; G06F 3/04886; H04L 63/0428; H04L 63/083; H04L 2209/24; H04L 51/10; H04L 51/12; H04L 51/24; H04L 63/068; H04L 63/0807; H04L 63/0853; H04L 63/0861; H04L 63/0876; H04L 63/12; H04L 67/10; H04L 9/3226; H04L 9/3228; H04L 9/3242; H04L 2463/082; H04L 63/10; H04L 65/403; H04L 67/22; H04L 67/306; G06Q 20/127; G06Q 20/18; G06Q 20/401; G06Q 20/40145; G06Q 20/352; G06Q 30/0208; G06Q 30/0269; G06Q 30/0279; G06Q 30/0601; G09C 5/00; H04W 12/06; H04W 12/00522; H04W 88/02; A63F 13/85; B42D 25/00; G06T 7/0002; G09G 2330/022; G09G 2354/00; G09G 2370/12; H04M 1/673; H04N 5/232; H04N 5/23206
See application file for complete search history.

(56) References Cited

U.S. PATENT DOCUMENTS

| | | | | |
|---|---|---|---|---|
| 2012/0293642 | A1* | 11/2012 | Berini | G06F 21/32 348/77 |
| 2013/0250087 | A1 | 9/2013 | Smith | |
| 2014/0266604 | A1 | 9/2014 | Masood et al. | |
| 2015/0287255 | A1* | 10/2015 | Hendrick | G07C 9/00087 340/5.53 |
| 2016/0072915 | A1* | 3/2016 | Decanne | G06F 17/30247 715/728 |
| 2016/0203346 | A1* | 7/2016 | Gardiner | G06K 7/10158 235/380 |
| 2016/0217312 | A1* | 7/2016 | Gardiner | G06K 9/00087 |
| 2017/0300799 | A1* | 10/2017 | Breed | G06K 19/07354 |
| 2017/0323279 | A1* | 11/2017 | Dion | G06Q 20/18 |
| 2017/0345235 | A1* | 11/2017 | Touret | G07C 9/00087 |
| 2018/0011973 | A1* | 1/2018 | Fish | G06F 21/35 |
| 2018/0101721 | A1* | 4/2018 | Nienhouse | G06K 9/00288 |

FOREIGN PATENT DOCUMENTS

| | | | |
|---|---|---|---|
| EP | 1 903 477 | A2 | 3/2008 |
| WO | WO 2005/024 732 | A1 | 3/2005 |
| WO | WO 2005/027023 | A1 | 3/2005 |
| WO | WO 20015/024 732 | A1 | 3/2005 |
| WO | WO 2008/055181 | A2 | 5/2008 |

* cited by examiner

ELECTRONIC ACCESS CONTROL METHOD

CROSS-REFERENCE TO RELATED APPLICATIONS

This application is a 371 national phase filing of International Application No. PCT/EP2016/060958, entitled "ELECTRONIC ACCESS CONTROL METHOD", filed 17 May 2016, which claims priority to German Patent Application No. 10 2015 108 330.2, entitled "ELEKTRONISCHES ZUGANGSKONTROLL VERF AHREN", filed 27 May 2015.

BACKGROUND

The present disclosure relates to the field of electronic access control, in particular the electronic access control at border crossings.

Electronic access controls of persons is of particular interest in a plurality of applications. Particularly in the case of access controls at border crossings, for example at airports, efficient identification of persons is desirable in order to grant or refuse entrance to said persons.

At the present time, an identification document of a person, for example an identity card or a passport, is verified at an entrance door when a person is subject to electronic access control. The person thereafter enters into an area beyond the entrance door, which thereupon closes. A biometric characteristic of the person is then sensed in this area in order to verify the identity of the person. The electronic access control thus normally ensues on the basis of two independent steps, whereby an isolating of the persons is realized.

This process requires a considerable amount of time in identifying the person and leads to reducing the efficiency of the electronic access control.

SUMMARY

It is thus the task of the present disclosure to develop an efficient concept for electronic access control.

This task is solved by means of the features of the independent claims. Advantageous further developments constitute the subject matter of the dependent claims, the description as well as the figures.

The present disclosure is based on the realization that the above task can be solved by sensing an identification characteristic of the person within an access region and sensing a biometric characteristic of the person within the access region, wherein sensing the person's biometric characteristic starts immediately after sensing the person's identification characteristic. The person can thereby still be situated in front of an access barrier. This can therefore enable dispensing with an isolating of persons in the access region.

Furthermore, sensing of the person in the access region can be realized by means of, for example, a light barrier, a laser scanner, a 3D camera, an imaging camera or an infrared camera. It can thus thereby be ensured that the sensing of the biometric characteristic and the sensing of the identification characteristic relate to the same person.

The sensing of the person can be realized utilizing a predetermined body model and/or a predetermined motion model of the person. Furthermore, also able to be identified is whether the person is alive.

The identification characteristic of the person can be sensed on the basis an of identification document of the person. The biometric characteristic of the person can be, for example, a photograph of the person and the identification characteristic of the person be, for example, a personal reference image. The identification characteristic of the person, in particular the personal reference image, can furthermore be retrieved from an identification characteristic server over a communication network. The sensed identification characteristic of the person can be compared to the sensed biometric characteristic of the person. An identification of the person can as a result be made.

This thereby achieves being able to faster perform the electronic access control, thus increasing the efficiency of the electronic access control. Furthermore, a higher number of persons to be identified can be processed through electronic access controls.

According to a first aspect, the disclosure relates to a method of electronic access control for identifying a person within an access region, wherein an identification document is associated with the person, comprising sensing an identification characteristic of the person in the access region on the basis of the identification document by means of an identification sensing device, transmitting the identification characteristic by means of the identification sensing device to a biometric sensing device, and sensing a biometric characteristic of the person by means of the biometric sensing device within the access region in response to the receipt of the identification characteristic in order to identify the person. This thus achieves the advantage of realizing an efficient concept for electronic access control.

The identification document can be one of the following identification documents: an identity document such as an identity card, passport, access control pass, authorization permit, company ID card, revenue stamp or ticket, birth certificate, driver's license or vehicle registration, payment instrument, e.g. a bank card or a credit card. The identification document can furthermore incorporate an electronically readable circuit, e.g. an RFID chip. The identification document can be single or multi-layer as well as paper and/or plastic-based respectively. The identification document can be constructed from plastic-based films bonded together into a card body by gluing and/or laminating, wherein the films preferentially have similar material properties.

The identification characteristic of the person can be read electronically from the identification document. The identification characteristic of the person can furthermore be applied to the identification document and sensed optically.

According to one example, the access region is restricted by means of an access barrier, whereby the biometric characteristic of the person is sensed when the access barrier is open or closed. This thereby achieves the advantage of being able to efficiently realize the electronic access control method.

The biometric characteristic of the person can furthermore be sensed when the access barrier is partly opened. The access barrier can be an entrance door, e.g. an air lock.

According to one example, the biometric characteristic of the person is a photo-graph of the person, whereby the identification characteristic of the person is a personal reference image. This thereby achieves the advantage of enabling efficiently sensing the biometric characteristic and the identification characteristic of the person.

The personal reference image can be standardized pursuant to the ISO/IEC 19794 or ICAO 9303 standard. The personal reference image can be perspectively rectified by the biometric sensing device.

According to one example, sensing the identification characteristic of the person comprises the following steps:

reading out a personal identifier providing an indication of the person from the identification document by means of the identification sensing device, transmitting the personal identifier to an identification characteristic server by means of the identification sensing device in order to retrieve the identification characteristic of the person from the identification characteristic server, and receiving the identification characteristic of the person by means of the identification sensing device from the identification characteristic server. This thereby achieves the advantage of the identification characteristic being able to be efficiently provided.

The personal identifier can be a personal item of data, e.g. a name of the person. The personal identifier can furthermore be a code and/or a pseudonym assigned to the person. The personal identifier can be a restricted ID of the identification document pursuant to the BSI TR-03110 standard.

The personal identifier can be read from the identification document electronically. The personal identifier can furthermore be applied to the identification document and read out optically.

The transmitting of the personal identifier to the identification characteristic server and the receiving of the personal identifier from the identification characteristic server by the identification sensing device can be realized over a communication network, e.g. the internet. The identification characteristic server can provide an eID service.

According to one example, the electronic access control method comprises a comparing of the identification characteristic to the biometric characteristic by means of the biometric sensing device. This thereby achieves the advantage of being able to efficiently verify the identity of the person.

The comparison can be made utilizing optical pattern recognition. The optical pattern recognition can encompass extracting image characteristics of the identification characteristic and the biometric characteristic, for example using scale-invariant feature transform (SIFT).

According to one example, the biometric characteristic of the person is a photograph of the person, wherein the identification characteristic of the person is a personal identifier providing an indication of the person read out from the identification document by means of the identification sensing device, and wherein the electronic access control method comprises the following steps: transmitting the personal identifier to an identification characteristic server by means of the biometric sensing device in order to retrieve a personal reference image from the identification characteristic server, and receiving the personal reference image from the identification characteristic server by means of the biometric sensing device. This thereby achieves the advantage of being able to efficiently realize the identification sensing device.

The transmitting of the personal identifier to the identification characteristic server and the receiving of the personal reference image from the identification characteristic server by means of the biometric sensing device can be performed over a communication network, e.g. the internet. The identification characteristic server can provide an eID service.

According to one example, the electronic access control method comprises comparing of the personal reference image to the person's photograph by means of the biometric sensing device. This thereby achieves the advantage of being able to efficiently verify the identity of the person.

The comparison can be made utilizing optical pattern recognition. The optical pattern recognition can encompass extracting image characteristics of the personal reference image and the photograph of the person, for example by employing scale-invariant feature transform (SIFT).

According to one example, the electronic access control method comprises a sensing of the person in the access region by means of a person sensing device, in particular a light barrier, a laser scanner, a 3D camera, an imaging camera or an infrared camera. This thereby achieves the advantage of being able to ensure that the sensing of the biometric characteristic and the sensing of the identification characteristic relate to the same person. The sensing of the person in the access region can comprise a tracking of the person in the access region.

The biometric characteristic of the person can be sensed by the biometric sensing device within the access region in response to the receipt of the identification characteristic and the sensing of the person.

According to one example, the person sensing device senses the person in the access region using a predetermined body model and/or a predetermined motion model of the person. This thereby achieves the advantage of the person being able to be efficiently sensed.

The predetermined body model can indicate static body characteristics of persons, for example a typical body size or typical body width. The predetermined motion model can indicate dynamic motion characteristics of persons, for example a typical speed or typical acceleration.

The predetermined body model and/or predetermined motion model can be derived from characteristics of human biomechanics.

According to one example, the sensing of the person in the access region includes the person sensing device sensing whether the person in the access region is alive. This thereby achieves the advantage of being able to efficiently identify simulated biometric characteristics.

Liveness can for example be identified on the basis of sensing 3D depth information of the person, sensing eye motion of the person, sensing a pulse of the person and/or sensing body temperature of the person.

According to a second aspect, the disclosure relates to an electronic access control system for identifying a person within an access region, wherein an identification document is associated with said person, comprising a biometric sensing device for sensing a biometric characteristic of the person within the access region and an identification sensing device for sensing an identification characteristic of the person within the access region on the basis of the identification document, wherein the identification sensing device is designed to transmit the identification characteristic to the biometric sensing device, wherein the biometric sensing device is designed to sense the biometric characteristic of the person within the access region in response to the receipt of the identification characteristic in order to identify the person. This thus achieves the advantage of realizing an efficient concept for electronic access control.

The electronic access control system can be used for electronic access control at border crossings. The biometric sensing device can comprise an imaging camera. The identification sensing device can comprise a reader terminal for identification documents.

The electronic access control method can be realized by means of the electronic access control system. Further features of the electronic access control system derive directly from the functionality of the electronic access control method.

According to one example, the electronic access control system further comprises a person sensing device, in particular a light barrier, a laser scanner, a 3D camera, an imaging camera or an infrared camera, for sensing the person in the access region. This thereby achieves the advantage of being able to ensure that the sensing of the biometric characteristic and the sensing of the identification characteristic relate to the same person.

The light barrier can sense the person's presence in a predetermined area within the access region. The laser scanner, the 3D camera, the imaging camera and the infrared camera can sense the person's position within the access region.

3D depth information of the person can be sensed using the 3D camera. The 3D camera can be realized based on a time-of-flight principle. An eye movement of the person can be sensed using the laser scanner, the 3D camera or the imaging camera.

The person's pulse can be sensed using the infrared camera. The person's body temperature can be sensed using the infrared camera.

According to one example, the electronic access control system further comprises an identification characteristic server for providing an identification characteristic of the person, in particular a personal reference image, via a communication network. This thereby achieves the advantage of being able to efficiently provide the identification characteristic of the person, in particular the personal reference image.

The identification characteristic of the person, in particular the personal reference image, can be prestored in the identification characteristic server. The identification characteristic server can provide an eID service.

According to one example, the electronic access control system is an eGate access control system. This thereby achieves the advantage of being able to efficiently implement the electronic access control system.

According to a third aspect, the disclosure relates to a computer program having a program code for executing the electronic access control method when the computer program is run on a computer. This thereby achieves the advantage of the electronic access control method being able to be automated and repeatedly executed.

The electronic access control system can be technically programmed to run the computer program.

The disclosure can be realized in hardware and/or software.

BRIEF DESCRIPTION OF THE DRAWINGS

Examples of the principles of this disclosure will be described in further detail with reference to the accompanying figures in describing further examples of the disclosure in greater detail.

DETAILED DESCRIPTION

Figure 1:
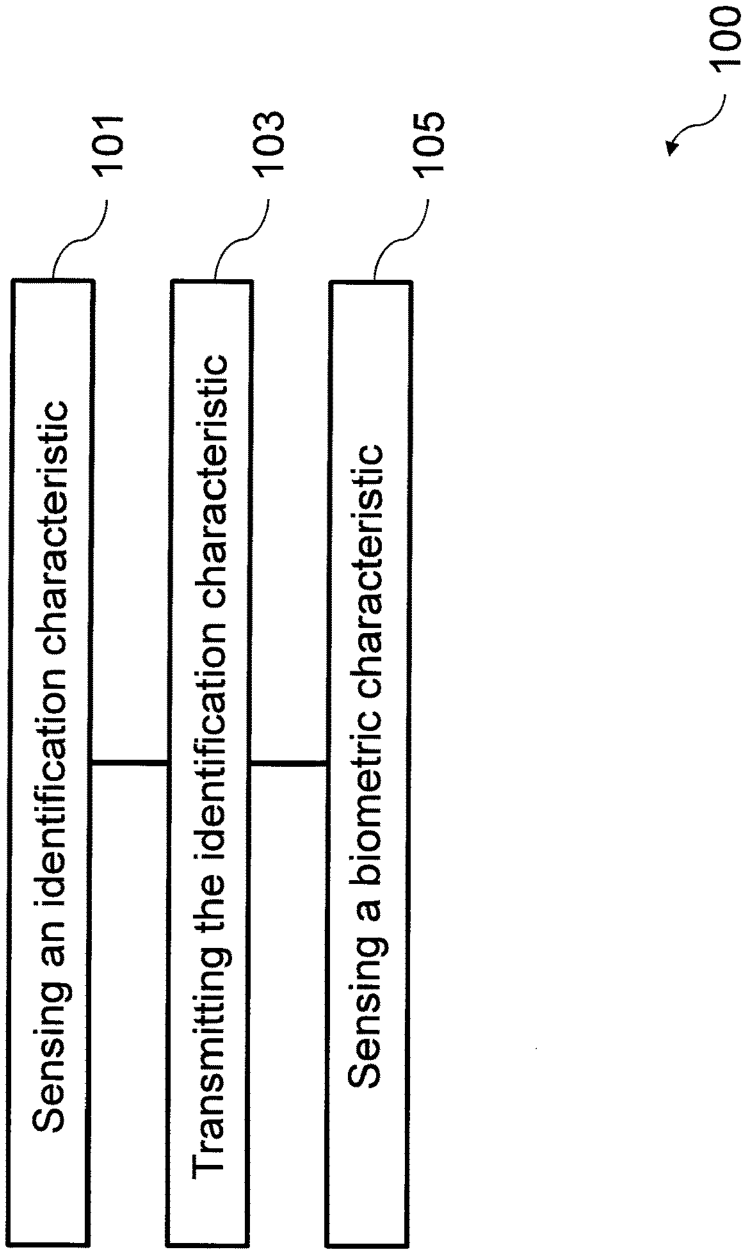
FIG. 1 shows a diagram of an electronic access control method for identifying a person within an access region in accordance with one example.

FIG. 1 shows a diagram of an electronic access control method 100 for identifying a person within an access region in accordance with one example. An identification document is associated with the person.

The electronic access control method 100 comprises sensing 101 an identification characteristic of the person in the access region on the basis of the identification document by means of an identification sensing device, transmitting 103 the identification characteristic by the identification sensing device to a biometric sensing device, and sensing 105 a biometric characteristic of the person by means of the biometric sensing device within the access region in response to the receipt of the identification characteristic in order to identify the person.

According to one example, the electronic access control method 100 comprises sensing the person in the access region by means of a person sensing device, in particular a light barrier, a laser scanner, a 3D camera, an imaging camera or an infrared camera. The sensing 105 of the person's biometric characteristic by the biometric sensing device within the access region can be implemented in response to receiving the identification characteristic and the sensing of the person.

Figure 2:
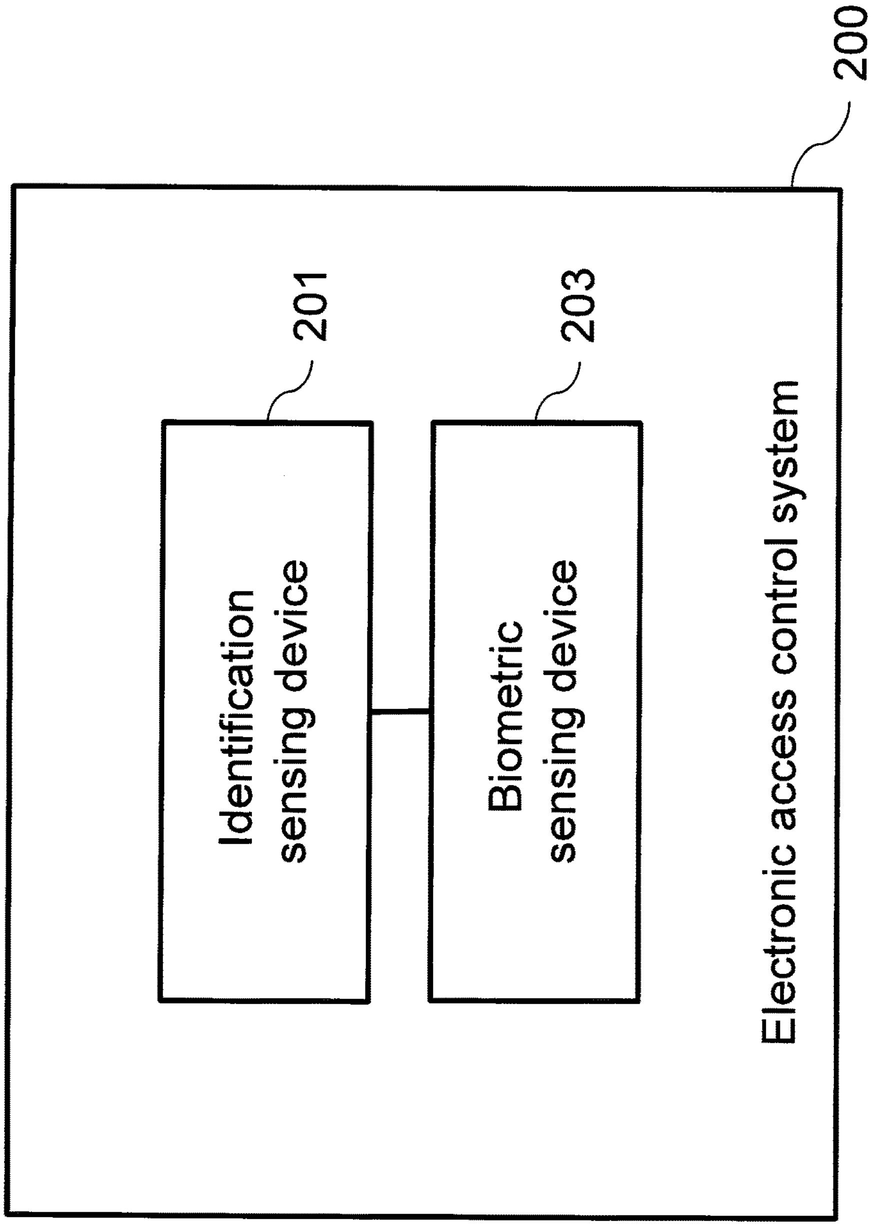
FIG. 2 shows a diagram of an electronic access control method for identifying a person within an access region in accordance with one example.

FIG. 2 shows a diagram of an electronic access control system 200 for identifying a person within an access region in accordance with one example. An identification document is associated with the person.

The electronic access control system 200 comprises a biometric sensing device 203 for sensing a biometric characteristic of the person within the access region and an identification sensing device 201 for sensing an identification characteristic of the person in the access region on the basis of the identification document, wherein the identification sensing device 201 is designed to transmit the identification characteristic to the biometric sensing device 203, wherein the biometric sensing device 203 is designed to sense the biometric characteristic of the person within the access region in response to the receipt of the identification characteristic in order to identify the person.

According to one example, the electronic access control system 200 further comprises a person sensing device, in particular a light barrier, a laser scanner, a 3D camera, an imaging camera or an infrared camera, for sensing the person in the access region. The biometric sensing device 203 can be designed to sense the biometric characteristic of the person within the access region in response to receiving the identification characteristic from the identification sensing device 201 and the sensing of the person by the person sensing device.

Figure 3:
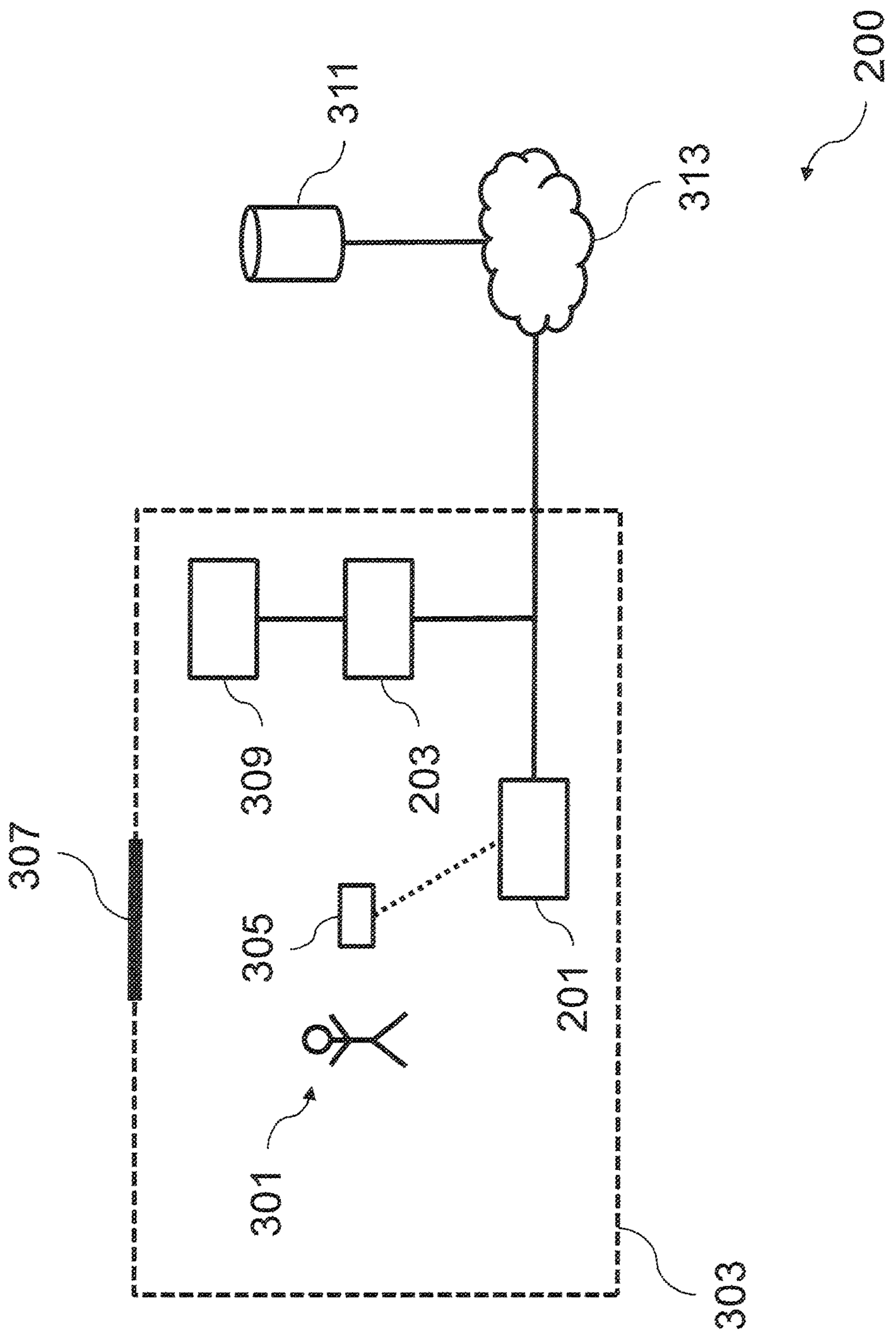
FIG. 3 shows a diagram of an electronic access control method for identifying a person within an access region in accordance with one example.

FIG. 3 shows a diagram of an electronic access control system 200 for identifying a person 301 within an access region 303 in accordance with one example. An identification document 305 is associated with the person 301.

The electronic access control system 200 comprises a biometric sensing device 203 for sensing a biometric characteristic of the person 301 within the access region 303 and an identification sensing device 201 for sensing an identification characteristic of the person 301 in the access region 303 on the basis of the identification document 305, wherein the identification sensing device 201 is designed to transmit the identification characteristic to the biometric sensing device 203, wherein the biometric sensing device 203 is designed to sense the biometric characteristic of the person 301 within the access region 303 in response to the receipt of the identification characteristic in order to identify the person 301.

The identification sensing device 201 can comprise a reader terminal for identification documents. The biometric sensing device 203 can comprise an imaging camera. The biometric sensing device 203 can compare the identification characteristic to the biometric characteristic. The biometric characteristic of the person 301 can be a photograph of the person and the identification characteristic of the person 301 can be a personal reference image.

The access region 303 is restricted by an access barrier 307, wherein the biometric characteristic of the person 301 is sensed by the biometric sensing device 203 when the access barrier 307 is open or closed.

The electronic access control system 200 further comprises a person sensing device 309, in particular a light barrier, a laser scanner, a 3D camera, an imaging camera or an infrared camera, for sensing the person 301 in the access region 303. The person sensing device 309 can sense the person 301 in the access region 303 utilizing a predetermined body model and/or a predetermined motion model of the person 301. The person sensing device 309 can furthermore perform a liveness detection of the person 301 in the access region 303. The biometric sensing device 203 can be designed to sense the biometric characteristic of the person 301 within the access region 303 in response to the receipt of the identification characteristic from the identification sensing device 201 and the sensing of the person 301 by the person sensing device 309.

The identification sensing device 201 can sense the identification characteristic of the person 301 in different ways. The identification characteristic of the person 301 can for example be read from the identification document 305 electronically. The identification characteristic of the person 301 can furthermore be applied to the identification document 305 and sensed optically.

Furthermore, the identification characteristic of the person 301 can be provided by an identification characteristic server 311 over a communication network 313. The sensing of the identification characteristic of the person 301 by the identification sensing device 201 thereby encompasses the identification sensing device 201 reading out a personal identifier which provides an indication of the person 301 from the identification document 305, the identification sensing device 201 transmitting the personal identifier to the identification characteristic server 311 over the communication network 313 in order to retrieve the identification characteristic of the person 301 from the identification characteristic server 311, and the identification sensing device 201 receiving the identification characteristic of the person 301 by the identification characteristic server 311 over the communication network 313.

According to a further example, the biometric characteristic of the person 301 is a photograph of the person, whereby the identification characteristic of the person 301 is a personal identifier which provides an indication of the person 301 read out from the identification document 305 by means of the identification sensing device 201. The identification sensing device 201 can transmit the personal identifier to the biometric sensing device 203. The biometric sensing device 203 can transmit the personal identifier to the identification characteristic server 311 over the communication network 313 in order to retrieve a personal reference image from the identification characteristic server 311 and receive the personal reference image from the identification characteristic server 311 over the communication network 313. In response to receiving the personal identifier, the biometric sensing device 203 can sense a photograph of a person within the access region 303 in order to identify the person 301. The biometric sensing device 203 can compare the personal reference image to the person's photograph.

The electronic access control system 200 can be an eGate access control system which can for example be used for access control at border crossings.

The following will describe further examples of the electronic access control method 100 and the electronic access control system 200.

The electronic access control method 100 and the electronic access control system 200 can be used to increase throughput and/or processing time, for example at eGate access control systems.

Customarily, two separate steps occur in electronic access control. First, an identification document 305 is presented by a person 301 at an entrance door and verified. A verification of a biometric characteristic of the person 301 thereafter follows in a transitional area between the entrance door and an exit door. The sensing of the biometric characteristic, for example a facial biometric characteristic of the person 301, thereby does not start until the entrance door behind the person 301 is closed. This occurs so that no other person can enter into the transitional area after verification of the identification document 305. The entrance door, the transitional area and the exit door can form an air lock. According to one example, the access barrier 307 forms the entrance door.

One example of the electronic access control system ensures that the person 301 whose identity had already been verified prior to entering is also the person 301 who enters. This can thereby accelerate the electronic access control process. A biometric sensing device 203 can start, and optionally also terminate, the sensing of a biometric characteristic, and optionally a liveness detection, of the person 301 as soon as the person 301 places the identification document 305 on an identification sensing device 201 and is still situated in front of the access barrier 307, e.g. the entrance door.

According to one example, a person sensing device 309, e.g. a light barrier, a distributed imaging camera system, a laser scanner or a 3D camera, is used to sense the person 301.

Sensing by means of a 3D camera can be based on a time-of-flight principle. A pre-determined body model, e.g. a complete body model, and/or a predetermined motion model can thereby be employed. Furthermore, the person sensing device 309 can sense multiple persons. This can thereby efficiently ensure that no other persons enter.

According to a further example, the sensing of the biometric characteristic of the person 301, and optionally the liveness detection of the person 301, is performed prior to passing through the access barrier 307 into the transitional area and the biometric characteristic is then sensed again within the transitional area, albeit at a lower biometric characteristic comparison threshold. The access control can thus be further accelerated.

Customary average processing times of electronic access control systems lie within a range of from 30 to 50 seconds. The electronic access control method 100 and the electronic access control system 200 enable an acceleration of several seconds, thereby achieving an increase in the average processing times. Furthermore, the quantity of electronic access control systems can be reduced at border crossings while maintaining the same throughput of people.

LIST OF REFERENCE NUMBERS

100 electronic access control method
101 sensing an identification characteristic
103 transmitting the identification characteristic
105 sensing a biometric characteristic
200 electronic access control system
201 identification sensing device

203 biometric sensing device
301 person
303 access region
303 identification document
307 access barrier
309 person sensing device
311 identification characteristic server
313 communication network

What is claimed is:

1. An electronic access control method for identifying a person within an access region, wherein an identification document is associated with the person, comprising:

sensing the person within the access region using a person sensing device;

sensing an identification characteristic of the person in the access region based at least in part on the identification document using an identification sensing device that is operatively coupled to the person sensing device;

transmitting the identification characteristic using the identification sensing device to a biometric sensing device;

sensing a biometric characteristic of the person using the biometric sensing device within the access region in response to receipt of the identification characteristic to identify the person; and comparing the identification characteristic to the biometric characteristic using the biometric sensing device.

2. The electronic access control method according to claim 1, wherein the access region is restricted using an access barrier, and wherein the biometric characteristic of the person is sensed when the access barrier is open or closed.

3. The electronic access control method according to claim 1, wherein the biometric characteristic of the person is a photograph of the person, and wherein the identification characteristic of the person is a personal reference image.

4. The electronic access control method according to claim 1, wherein the sensing of the identification characteristic of the person comprises:

reading out a personal identifier providing an indication of the person from identification document using the identification sensing device;

transmitting the personal identifier to an identification characteristic server using the identification sensing device to retrieve the identification characteristic of the person from the identification characteristic server; and receiving the identification characteristic of the person sing the identification sensing device from the identification characteristic server.

5. The electronic access control method according to claim 1, wherein the biometric characteristic of the person is a photograph of the person, Wherein the identification characteristic of the person is a personal identifier providing an indication of the person read out from the identification document using the identification sensing device, and wherein the electronic access control method comprises:

transmitting the personal identifier to an identification characteristic server using the biometric sensing device to retrieve a personal reference image from the identification characteristic server, and receiving the personal reference image from the identification characteristic server using the biometric sensing device.

6. The electronic access control method according to claim 5, wherein the electronic access control method comprises comparing the personal reference image to the photograph of the person using the biometric sensing device.

7. The electronic access control method according to claim 1, wherein the sensing of the person in the access region using the person sensing device is performed by using a predetermined body model or a predetermined motion model of the person.

8. The electronic access control method according to claim 1, wherein the sensing of the person in the access region includes a liveness detection of the person in the access region using the person sensing device.

9. The electronic access control method according to claim 1, wherein the person sensing device is at least one of a light harrier, a laser scanner, a 3D camera, an imaging camera, or an infrared camera.

10. An electronic access control system for identifying a person within an access region, wherein an identification document is associated with the person, comprising:

a person sensing device configured to sense the person within the access region;

a biometric sensing device configured to sense a biometric characteristic of the person within the access region; and an identification sensing device configured to sense an identification characteristic of the person within the access region based at least in part on the identification document, wherein the identification sensing device is operatively coupled to the person sensing device and is configured to transmit the identification characteristic to the biometric sensing device;

wherein the biometric sensing device is configured to sense the biometric characteristic of the person within the access region in response to receipt of the identification characteristic to identify the person, and wherein the biometric sensing device is configured to compare the identification characteristic to the biometric characteristic.

11. The electronic access control system according to claim 10, further comprising:

an identification characteristic server configured to provide an identification characteristic of the person via a communication network.

12. The electronic access control system according to claim 11, wherein the identification characteristic of the person is a personal reference image.

13. The electronic access control system according to claim 10, wherein the electronic access control system is an eGate access control system.

14. The electronic access control system according to claim 10, wherein the person sensing device is at least one of a laser scanner, a 3D camera, an imaging camera or an infrared camera.

15. A non-transitory computer-readable medium storing computer-executable code for executing an electronic access control method, the code executable by a processor to:

sense the person within the access region using a person sensing device;

sense an identification characteristic of the person in the access region based at least in part on the identification document using an identification sensing device that is operatively coupled to the person sensing device;

transmit the identification characteristic using the identification sensing device to a biometric sensing device;

sense a biometric characteristic of the person using the biometric sensing device within the access region in response to receipt of the identification characteristic to identify the person; and compare the identification characteristic to the biometric characteristic using the biometric sensing device.

16. The non-transitory computer-readable medium according to claim 15, wherein the access region is restricted using an access barrier, and wherein the biometric characteristic of the person is sensed when the access barrier is open or closed.

17. The non-transitory computer-readable medium according to claim 15, wherein the biometric characteristic of the person is a photograph of the person, and wherein the identification characteristic of the person is a personal reference image.

* * * * *